United States Patent
Johnson et al.

(10) Patent No.: US 9,836,036 B2
(45) Date of Patent: *Dec. 5, 2017

(54) AGRICULTURAL IMPLEMENT WITH AUTOMATED RECOGNITION OF SEED ATTRIBUTES

(71) Applicant: CNH Industrial America LLC, New Holland, PA (US)

(72) Inventors: Blair J. Johnson, Sandwich, IL (US); John Stratton, Denver, CO (US); Andrew Meyer, Prospect Heights, IL (US); Scott Andrew Elkins, Plainfield, IL (US); Todd T. Taylor, Kendallville, IN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,973

(22) Filed: Oct. 27, 2015

(65) Prior Publication Data
US 2016/0044858 A1    Feb. 18, 2016

Related U.S. Application Data

(63) Continuation-in-part of application No. 13/859,214, filed on Apr. 9, 2013.

(51) Int. Cl.
*G05B 15/02* (2006.01)
*A01C 21/00* (2006.01)
*A01M 7/00* (2006.01)

(52) U.S. Cl.
CPC .............. *G05B 15/02* (2013.01); *A01C 21/00* (2013.01); *A01M 7/0042* (2013.01); *A01M 7/0085* (2013.01); *A01M 7/0092* (2013.01)

(58) Field of Classification Search
CPC ... A01C 21/00; A01M 7/0042; A01M 7/0032; A01M 7/0025; A01M 7/00;
(Continued)

(56) References Cited

U.S. PATENT DOCUMENTS 4,580,721 A * 4/1986 Coffee ...................... B05B 5/16
222/23
6,474,500 B1   11/2002 Carr et al.
(Continued)

FOREIGN PATENT DOCUMENTS

CN         103824169 A     5/2014

OTHER PUBLICATIONS

"Precision Agriculture and Biotechnology", Jess Lowenberg-DeBoer, May 2003 (3 pages).
(Continued)

*Primary Examiner* — Christopher J. Novosad
(74) *Attorney, Agent, or Firm* — Rebecca L. Henkel; Rickard K. DeMille

(57) ABSTRACT

An agricultural implement arrangement includes a container of seed having an ID tag associated therewith; an implement for applying a product to a geographic area; an electrical reader configured for reading the ID tag and providing an output signal; and an electrical processing circuit coupled with the reader and the implement. The ID tag has data representing at least one attribute associated with the seed. The electrical processing circuit receives the output signal and controls the implement, dependent upon the output signal.

18 Claims, 4 Drawing Sheets

(58) Field of Classification Search
CPC .............. A01M 7/0085; A01M 7/0082; A01M 7/0092; A01M 7/0089; G05B 15/02; G05B 15/00
See application file for complete search history.

(56) References Cited

U.S. PATENT DOCUMENTS

| | | |
|---|---|---|
| 6,671,698 B2 | 12/2003 | Pickett et al. |
| 7,975,632 B2 | 7/2011 | Gogerty et al. |
| 8,473,168 B2 | 6/2013 | Goldman et al. |
| 8,639,383 B2 | 1/2014 | Goldman et al. |
| 2009/0096574 A1* | 4/2009 | Oberle .................... G06F 21/35 340/5.8 |
| 2011/0135161 A1 | 6/2011 | Koutsky et al. |
| 2012/0183675 A1 | 7/2012 | Reineccius et al. |
| 2012/0188364 A1 | 7/2012 | Johnson et al. |
| 2013/0152836 A1 | 6/2013 | Deppermann et al. |
| 2013/0185104 A1 | 7/2013 | Klavins |
| 2013/0241698 A1* | 9/2013 | Rasmussen ........ G06K 17/0022 340/10.1 |

OTHER PUBLICATIONS

"Americot, Inc. Introduces Cotton Seed Industry's First QR Code", Americot, Mar. 17, 2015 (1 page).
"Seed Count R-60+, Specifically designed for seed research with highest speed precision and flexibility", Wintersteiger, Mar. 17, 2015 (1 page).

* cited by examiner

US 9,836,036 B2

AGRICULTURAL IMPLEMENT WITH AUTOMATED RECOGNITION OF SEED ATTRIBUTES

CROSS REFERENCE TO RELATED APPLICATIONS

This is a continuation-in-part of U.S. patent application Ser. No. 13/859,214, entitled "AGRICULTURAL IMPLEMENT WITH AUTOMATED RECOGNITION OF CHEMICAL TOTE CONTENTS", filed Apr. 9, 2013, which is incorporated herein by reference.

BACKGROUND OF THE INVENTION

1. Field of the Invention

The present invention relates to agricultural implements, and, more particularly, to agricultural implements utilizing precision farming techniques.

2. Description of the Related Art

Agricultural planters are commonly used implements to plant seeds in soil. An agricultural planter can include a chassis that carries one or more storage tanks carrying seed, and chemical applications that are to be applied to the field during the planting operation, a hitch mechanism that attaches to a tractor or other implement pulled by a tractor, and a tool bar that row units can be connected to so they are carried by the chassis. The planter can also include a pneumatic system carried by the chassis that supplies pressurized air to transport the seeds or other particulate from the storage tanks to the row units.

Each row unit of the agricultural planter places seeds in the field. Typically, the row units are laterally arranged along a length of the tool bar so that as the planter is pulled across the field, each row unit plants seeds at predefined intervals along the path it is pulled across. To plant seeds, the row units perform four main operations as they are pulled: opening a trench in the soil; placing a seed into the formed trench at appropriate intervals; closing the formed trench to put soil on top of the placed seed; and packing soil on top of the seed to provide desirable soil contact with the placed seed. To open a trench in the soil, a furrowing disc system, which may include an opening disc, cuts into the soil and rotates, dislocating soil as it rotates to form the trench. Once the trench is open, a seed is placed in the trench by a metering device which receives seeds from the main storage tank(s) or a row unit storage tank and typically utilizes a combination of differential air pressure, to select the seed, and gravity to place the seed in the trench at predefined intervals along the pulled path so that adjacent seeds in the row are not too close to one another. One or more closing discs carried behind the furrowing disc are pressed into the soil and also rotate as the planter is pulled to replace soil dislocated by the furrowing disc in the trench or dislocate adjacent soil into the trench to cover the seed placed in the trench with soil. Finally, a pressing wheel carried behind the closing disc(s) exerts pressure on the soil covering the seed to press the soil down onto the seed and provide good soil contact with the seed. By having multiple row units working in unison as the planter is pulled across a field, many seeds can be effectively planted in an efficient manner.

Precision farming systems are widely used with agricultural implements, including planters. In general, a precision farming system or technique uses geospatial data for a given geographic region (e.g., agricultural field, strip or other area) and carries out one or more specified tasks based at least in part on the geospatial data. The geospatial data is usually derived from a global positioning system (GPS) sensor located onboard the vehicle, and the position of the vehicle at least in part triggers various actions or tasks to occur.

For example, agricultural vehicles such as planters, sprayers, fertilizer spreaders, etc, can carry out variable rate application of a product to the field based on the geospatial data. The fields can be mapped for soil type, fertility or pH levels, etc, and the GPS data for the current position of the vehicle can trigger different application rates as the vehicle traverses across the field.

What is needed is an improved precision farming arrangement that allows product to be efficiently and cost effectively applied to a field.

SUMMARY OF THE INVENTION

The present invention provides a bag of seed with some type of ID tag, such as a barcode, Quick Response (QR) code, radio frequency ID (RFID) tag, etc. Data which is stored on the ID tag is uploaded to and utilized by a precision farming system for application of an agricultural product in a geographic area, such as seed, herbicide, etc.

The invention in one form is directed to an agricultural implement arrangement including a container of seed having an ID tag associated therewith; an implement for applying a product to a geographic area; an electrical reader configured for reading the ID tag and providing an output signal; and an electrical processing circuit coupled with the reader and the implement. The ID tag has data representing at least one attribute associated with the seed. The electrical processing circuit receives the output signal and controls the implement, dependent upon the output signal.

An advantage of the present invention is that data corresponding to a particular seed is automatically uploaded into the precision farming system.

Another advantage is that the seed related data can be carried over and used from one farming operation to another, such as planting and spraying.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
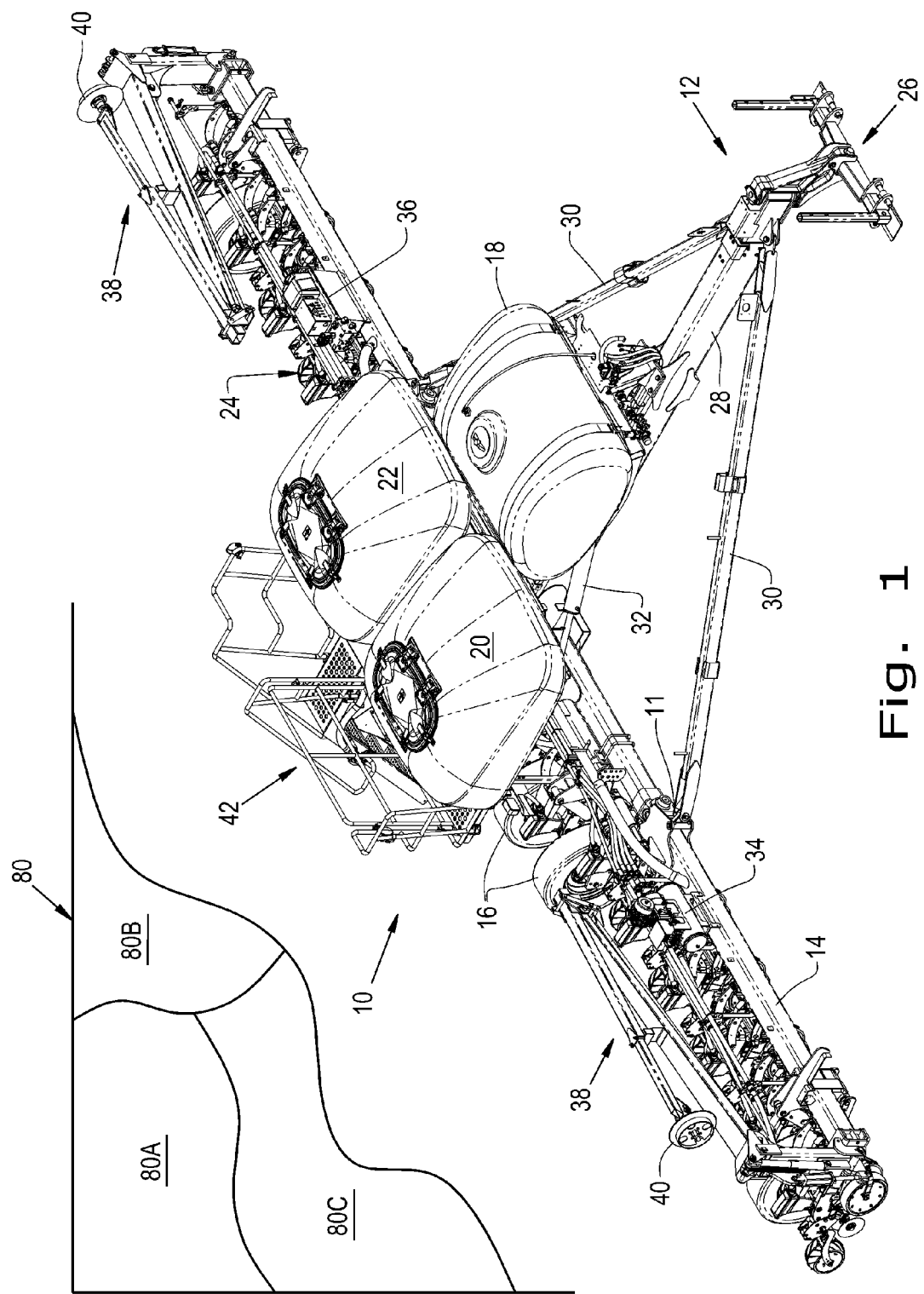
FIG. 1 is a perspective view of an agricultural implement in the form of a planter, shown traversing over a geographic area such as a field.

Referring now to the drawings, and more particularly to FIG. 1, there is shown an embodiment of an agricultural implement in the form of a planter 10, which generally includes a chassis 11 forming a support structure for components of the planter 10. The planter 10 can include a hitch assembly 12 at a front of the planter 10 connected to a tool bar 14 to form the chassis 11, main wheels 16 carried by the chassis 11 near a rear of the planter 10, one or more storage tanks 18, 20, 22 carried by the chassis 11 that can be filled with seed or other agriculture material, and a plurality of row units 24 connected to the tool bar 14 and arranged laterally across a length of the tool bar 14 so that they are carried by the chassis. The hitch assembly 12 can include a hitch 26 configured to be connected to a tractor or other agricultural implement (not shown) so that the planter 10 can be pulled in a forward direction of travel. The hitch 26 can be integrally formed with or connected to a hitch bar 28 that is connected to the tool bar 14 by bracing bars 30 and one or more cylinders 32. As can be seen throughout FIG. 1, the planter 10 can also have various hydraulic, pneumatic, and electrical lines (unnumbered) throughout to support various cylinders and systems that are included on the planter 10, such as a pneumatic system 34 connected to the tool bar 16 and an electric generator 36 also connected to the tool bar 16. A marking device 38 can be connected to each lateral end of the tool bar 14 and extendable so that a marking disc 40 of the marking device 38 can create a line in the soil as the planter 10 is pulled that helps a user in positioning the planter 10 to create subsequent rows. A stair assembly 42 can be mounted to the back of the planter 10 to allow an operator to access the storage tanks 20 and 22.

Figure 2:
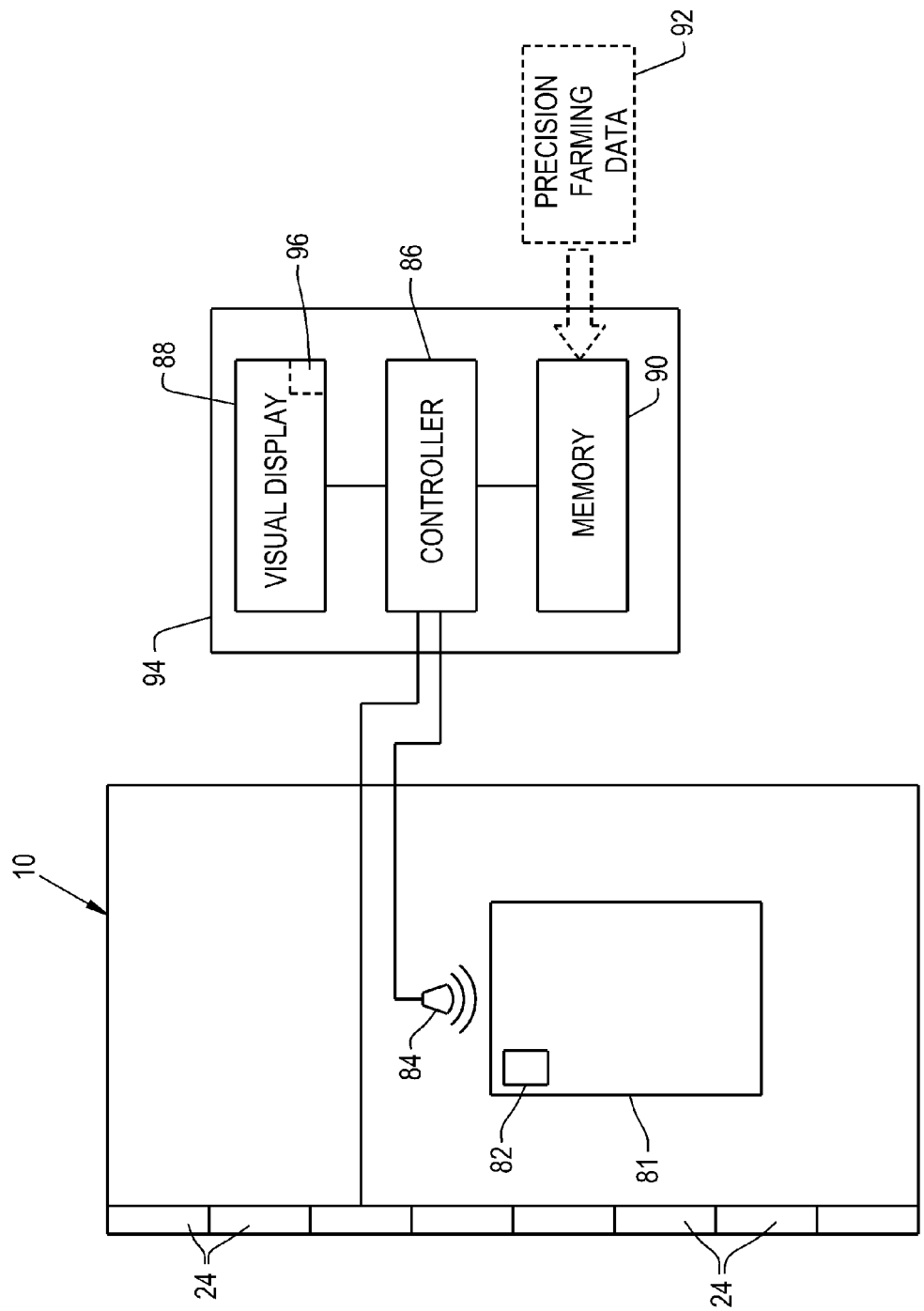
FIG. 2 is a schematic view of an embodiment of an agricultural implement in the form of an agricultural planter.

Referring now to FIG. 2, there is shown a schematic illustration of the agricultural planter 10 for seeding within a geographic area, such as all or a portion of field 80 shown in FIG. 1.

According to an aspect of the present invention, agricultural seed or seed applicant information can be scanned, stored and utilized throughout the planting, spraying and/or other farming operations. To that end, an ID tag 82 can be attached or otherwise affixed to a container of seed 81 and automatically read using an appropriate reader. The container of seed 81 is assumed be a bag of seed in the illustrated embodiment, but could be another suitable type of container, such as a bulk seed hopper or the like.

ID tag 82 is shown positioned toward an end of the bag of seed 81 but can be positioned at any suitable location allowing automated reading thereof. ID tag 82 can be any type of tag which can be read in an automated manner, such as a radio frequency identification (RFID) tag, barcode, Quick Response (QR) code, etc. In the illustrated embodiment, ID tag 82 is assumed to be in the form of a tag with a barcode.

Barcodes are well known for many different purposes, and basically include a number of parallel bars of varying thickness, providing a 1 dimensional code when read by a suitable reader. QR codes are similar to bar codes, but provide a 2 dimensional code when read by a suitable reader. Radio frequency identification (RFID) tags are well known throughout industry, and are being increasingly utilized for supply chain management, inventory management, and logistic control. These tags can be written to and read from a handheld transceiver (referred to as an RFID reader) or fixed portal. For example, an RFID tag can be placed upon a shipping container and contain data corresponding to the contents of the shipping container. The RFID tag can be read using a handheld reader or a portal reader, and the data offloaded from the reader to a computer for processing.

ID tag 82 includes data representing an attribute of the seed within the bag of seed 81. For example, ID tag 82 can include data representing a manufacturer, product number, suggested population rate, total number of seeds per bag, active ingredients within the bag, inert ingredients within the bag, etc. Other types of data representing attributes associated with the seed may also be possible.

Reader 84 can be a barcode reader if ID tag 82 is configured as a barcode. For some applications, reader 84 can be a handheld reader providing a wired or wireless output signal to the electrical processing circuit 86. In the event that the ID tag 82 is an RFID tag, then the reader 84 can be handheld, or carried directly or indirectly by chassis 11 and positioned at a suitable location allowing automated reading of ID tag 82. For example, reader 84 can be in the form of an RFID portal reader which is positioned at a suitable location onboard the planter 10.

Located within operator cab 94 are an electrical processing circuit 86, a visual display 88 and a memory 90. Visual display 88 is coupled with electrical processing circuit 86 and provides a visual display to an operator located within operator cab 94. Visual display 88 can display a number of different types of visual information, including data associated with the seed within the bag of seed 81. Visual display 88 may be any suitable type of display, such as an LED display, LCD display, etc.

Memory 90 likewise is coupled with electronic controller 86 and may be any suitable type of memory, such as a static or dynamic memory. Memory 90 may include any type of relevant data, including precision farming data which may be generated by the operator or obtained from a number of different commercial sources (represented by the dashed box 92). Such data can be uploaded to memory 90 using any suitable technique, such as a direct wired or wireless upload, wireless Internet upload, satellite upload, etc. The precision farming data may be of different data types, such as a topographical map of the geographic area; at least one soil type associated with the geographic area; at least one application rate of the active ingredient associated with the geographic area; at least one fertility level of soil associated with the geographic area; and at least one pH level of soil associated with the geographic area. For purposes of illustration, a portion of a topographical map for a field 80, including soil types 80A, 80B and 80C is shown in FIG. 1.

Electrical processing circuit 86 is shown as a digital electronic controller in FIG. 7, but could also be configured as an analog type processing circuit. Electronic controller 86 is coupled with reader 84, either wired or wireless, and receives output signals from reader 84 representing data associated with the seed within the bag of seed 81. Electronic controller 86 controls operation of reader 84 to read ID tag 82 either automatically or on command.

For manual or "on command" reading of ID tag 82, and operator within operator cab 94 can manually depress a switch or button, such as a virtual button 96 on visual display 88. A corresponding output signal is provided from visual display 88 to electronic controller 86, which in turn effects the read operation of ID tag 82 using reader 84.

Electronic controller 86 receives precision farming data from memory 90 associated with the geographic area represented by field 80. Electronic controller 86 matches the data read from ID tag 82 and associated with the seed within the bag of seed 81 with the precision farming data to establish one or more seeding or application rates over at least a portion of field 80. For example, when planting, the application rate can be a population rate of the seed within the different soil types 80A, 80B and 80C within the field 80. If the seed information is carried over to subsequent farming operations such as spraying, the application rate can be an application rate of a herbicide for different soil types 80A, 80B and 80C within field 80.

As shown in FIG. 1, a field 80 can include multiple soil types 80A, 80B and 80C. By automatically matching the data from ID tag 82 with the precision farming data, electronic controller 86 can vary the application rate from one soil type to another as the planter 10 (or sprayer, etc.) moves across field 80. An operator can optionally be prompted on visual display 88 to accept the application rates based on the matched data, or can manually enter another application rate(s) by overriding the application rates based on the match data.

Figure 3:
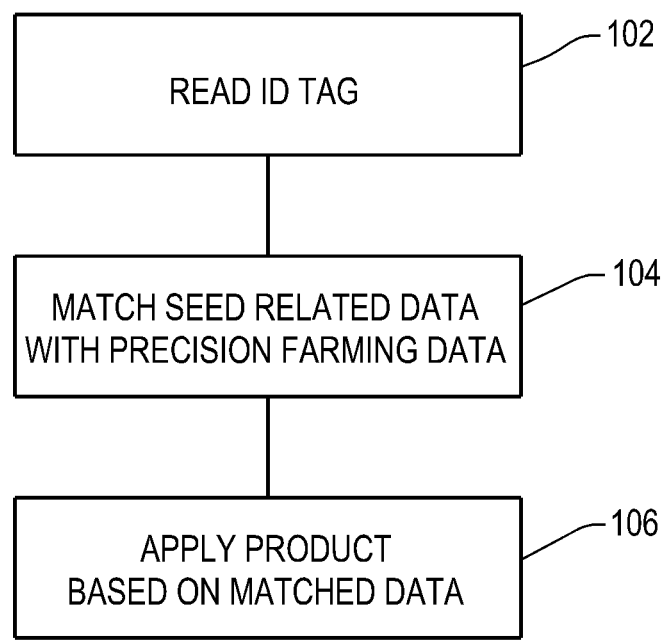
FIG. 3 is a flowchart of an embodiment of a method of the present invention for seeding within a geographic area using the planter of FIG. 2.

Referring now to FIG. 3, sometime prior to or while the agricultural planter 10 is operating, the ID tag 82 is read and the attributes associated with the seed are uploaded to the precision farming system (block 102). Electronic controller 86 matches the contents data of the ID tag 82 with the precision farming data 92 and establishes one or more application rates of a product which is to be applied to a geographic area (block 104). Various actuators (not shown) onboard the planter 10 (or other implement, such as a sprayer, etc.) are used to apply the product at known application rates under control of electronic controller 86 using the matched data (block 106). Using initial volumes of product, known application rates, etc. the operator can be alerted when product becomes low in one or more product containers (such as hopes, bulk tanks, etc.)

Figure 4:
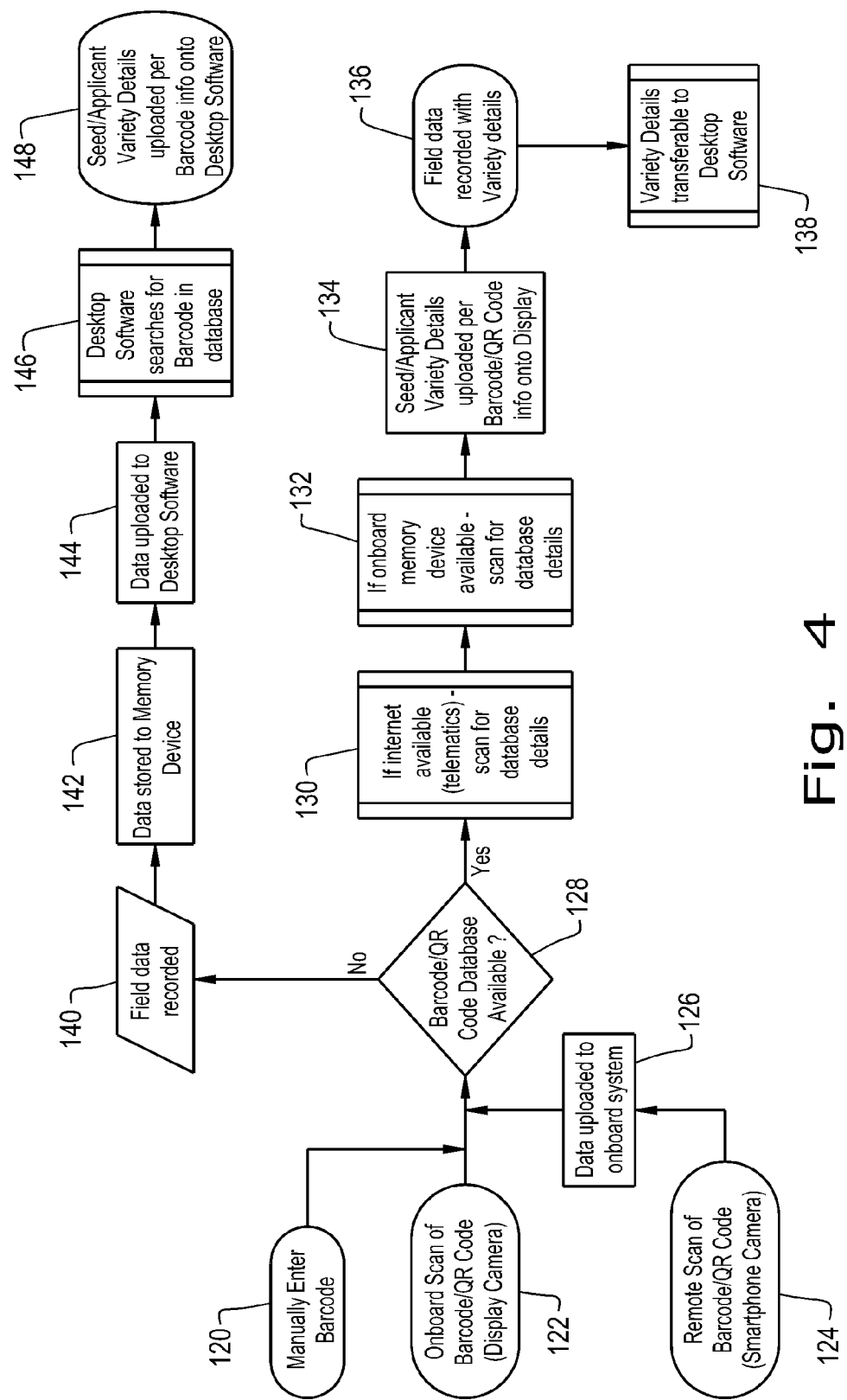
FIG. 4 is a more detailed flowchart of an embodiment of a method of the present invention for seeding within a geographic area.

More specifically, and referring now to FIG. 4, the data which is stored on the ID tag 82 can be stored in the memory 90 in a number of ways. For example, the data can be manually entered on display 88 by a user (block 120), scanned onboard the planter using an automatic reader (block 122; e.g., a display camera), or scanned remotely and uploaded (block 124; e.g., a mobile phone QR code scanner). If scanned remotely, such as with a mobile phone, the data can be uploaded at that time or later to the onboard precision farming system (block 126).

At decision block 128, a determination is made as to whether a database is available corresponding to the seed attribute data stored on the ID tag 82. The database can be obtained or exist at a number of locations. For example, the database can exist at a remote source and be obtained over the internet via a suitable connection (e.g., telematics, mobile data network, etc.; block 130). Alternatively, the database can already exist in the memory 90 (such as via an earlier upload prior to the field operation), and then be accessed and utilized for the precision farming operation (block 132). The seed/applicant variety information per the ID tag 82 can be uploaded and displayed on the display 88 for viewing by an operator (block 134). Field data can also be recorded with variety details (block 136). The variety details can also be transferred to offsite remote desktop software for offsite viewing and/or later analysis (block 138).

On the other hand, if a database corresponding to the data on the ID tag 82 is not available (block 128, "NO"), then field data can be recorded and stored in the memory 90 (blocks 140 and 142). The stored data can uploaded to a remote site, such as a desktop computer (block 144), and the desktop software can search for the data stored on the ID tag 82 (block 146) and upload the seed/applicant data from a corresponding database (block 148). This data can then by used by the precision farming system during the farming operation.

A process for reading the contents of a single bag of seed 81 is described above for simplicity sake. However, it is also to be understood that this same process of reading the data associated with multiple bags of seed 81 can be effected using the same methodology. Further, under some circumstances, it is necessary to use different seed varieties in different row units of a planter (e.g., when planting seed corn). Under this type of situation, it is possible to upload the data for multiple seed varieties to the electrical processing circuit 86.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement arrangement, comprising:
a container of seed having an ID tag associated therewith, the ID tag having data representing at least one attribute associated with the seed;
an implement for applying a product to a geographic area;
an electrical reader configured for reading the ID tag and providing an output signal; and
an electrical processing circuit coupled with the electrical reader and the implement, the electrical processing circuit receiving the output signal and controlling the implement, dependent upon the output signal,
wherein said electrical processing circuit includes farming data associated with the geographic area, and matches the data associated with the seed with the farming data to establish an application rate of the product over at least a portion of the geographic area.

2. The agricultural implement arrangement of claim 1, wherein the data representing at least one attribute of the seed comprises at least one of:
a manufacturer;
a product number;
a suggested population rate;
a total number of seeds per bag; and
inert ingredients within the bag.

3. The agricultural implement arrangement of claim 1, wherein the ID tag is affixed to the container of seed.

4. The agricultural implement arrangement of claim 3, wherein the container of seed is a bag of seed.

5. The agricultural implement arrangement of claim 1, wherein the ID tag is one of a radio frequency identification (RFID) tag, a bar code, and a quick response (QR) code.

6. The agricultural implement arrangement of claim 5, wherein the electrical reader is one of an RFID reader, a bar code reader, and a QR code reader.

7. The agricultural implement arrangement of claim 1, wherein the electrical processing circuit is coupled with the electrical reader and the implement by at least one of a wired and wireless coupling.

8. The agricultural implement arrangement of claim 1, wherein the electrical processing circuit is an electronic controller.

9. An agricultural implement arrangement, comprising:
a container of seed having an ID tag associated therewith, the ID tag having data representing at least one attribute associated with the seed;
an implement for applying a product to a geographic area;
an electrical reader configured for reading the ID tag and providing an output signal; and an electrical processing circuit coupled with the electrical reader and the implement, the electrical processing circuit receiving the output signal and controlling the implement, dependent upon the output signal, wherein the agricultural implement is a planter and the product is seed.

10. The agricultural implement arrangement of claim 9 wherein the data representing at least one attribute of the seed comprises at least one of:

a manufacturer;
a product number;
a population rate;
a total number of seeds per bag; and
inert ingredients within the bag.

11. The agricultural implement arrangement of claim 9, wherein the ID tag is affixed to the container of seed.

12. The agricultural implement arrangement of claim 11, wherein the container of seed is a bag of seed.

13. The agricultural implement arrangement of claim 9, wherein the ID tag is one of a radio frequency identification (RFID) tag, a bar code, and a response (QR) code.

14. The agricultural implement arrangement of claim 13, wherein the electrical reader is one of an RFID reader, a bar code reader, and a QR code reader.

15. The agricultural implement arrangement of claim 9 wherein the electrical processing circuit is coupled with the electrical reader and the implement by at least one of a wired and wireless coupling.

16. The agricultural implement arrangement claim 9, wherein said electrical processing circuit includes farming data associated with the geographic area, and matches the data associated with at least one seed with the farming data to establish an application rate of the product over at least one portion of the geographic area.

17. The agricultural implement arrangement of claim 9, wherein the electrical processing circuit is an electronic controller.

18. A method of applying an agricultural product to a geographic area using an agricultural implement, the method comprising the steps of:

reading an ID tag using a reader;

outputting an output signal from the reader to an electrical processing circuit carried onboard the agricultural implement; and controlling application of the agricultural product to the geographic area using the electrical processing circuit, dependent upon the output signal, wherein the electrical processing circuit carries out the sub-step of matching the data associated with at least one seed with farming data to establish an application rate of the agricultural product over at least a portion of the geographic area.

* * * * *